United States Patent
Bachar et al.

(10) Patent No.: US 9,052,950 B2
(45) Date of Patent: *Jun. 9, 2015

(54) SELECTIVE CONSTANT COMPLEXITY DISMISSAL IN TASK SCHEDULING

(75) Inventors: Yariv Bachar, Ma'abarot (IL); Ilai Harsgor-Hendin, Kfar Saba (IL); Ehud Meiri, Tel Aviv (IL); Oded Sonin, Omer (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 470 days.

This patent is subject to a terminal disclaimer.

(21) Appl. No.: 13/478,196

(22) Filed: May 23, 2012

(65) Prior Publication Data

US 2012/0233620 A1 Sep. 13, 2012

Related U.S. Application Data

(63) Continuation of application No. 12/859,467, filed on Aug. 19, 2010.

(51) Int. Cl.
*G06F 9/46* (2006.01)
*G06F 9/48* (2006.01)

(52) U.S. Cl.
CPC ........ *G06F 9/4881* (2013.01); *G06F 2209/486* (2013.01)

(58) Field of Classification Search
None
See application file for complete search history.

(56) References Cited

U.S. PATENT DOCUMENTS

| 7,127,446 | B1 | 10/2006 | Menezes et al. |
| 7,600,049 | B2 | 10/2009 | Oakes et al. |
| 2007/0088871 | A1 | 4/2007 | Kwong et al. |
| 2008/0222321 | A1 | 9/2008 | Hart et al. |
| 2010/0333094 | A1 | 12/2010 | Restall et al. |

FOREIGN PATENT DOCUMENTS

| JP | 2007-165962 | | 6/2007 |
| KR | 20030051929 | A | 6/2003 |

OTHER PUBLICATIONS

P. Bhatti et al., "Building a robust distributed system : some lessons from R-GMA," Journal of Physics: Conference Series 119, 2008, 10 pages.

*Primary Examiner* — Gregory A Kessler
(74) *Attorney, Agent, or Firm* — Griffiths & Seaton PLLC

(57) ABSTRACT

A strictly increasing function is implemented to generate a plurality of unique creation stamps, each of the plurality of unique creation stamps increasing over time pursuant to the strictly increasing function. A new task to be placed with the plurality of tasks is labeled with a new unique creation stamp of the plurality of unique creation stamps. The one of the list of dismissal rules holds a minimal valid creation (MVC) stamp, which is updated when a dismissal action for the one of the list of dismissal rules is executed. The dismissal action acts to dismiss a selection of tasks over time due to continuous dispatch.

7 Claims, 5 Drawing Sheets

```
1   DispatchTasks() {
2    loop forever {
3     taskRecord = GetNextTaskForExecution ();
4     isDismissed = false;
5     for ( i from 0 to nRules ) {
6      rule = dismissalRuleArray [i];
7      if (Match (taskRecord, rule) &&
8          taskRecord.creationStamp < rule.mvc) {
9         isDismissed = true;
10        break;
11     }
12    }
13    if (isDismissed) {
14     DiscardTask();
15    } else {
16     AllocateResources();
17     ExecuteTask();
18    }
19   }
20  }
```

FIG. 5

SELECTIVE CONSTANT COMPLEXITY DISMISSAL IN TASK SCHEDULING

BACKGROUND OF THE INVENTION

1. Field of the Invention

The present invention relates in general to computers, and more particularly to apparatus, method and computer program product embodiments for selective constant complexity dismissal in task scheduling in a computing environment.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

Computing environments such as computing storage or computing processing environments may be called upon to execute a large number of tasks. In this regard, such computing environments may leverage scheduling systems to prioritize, execute, and dismiss various tasks.

SUMMARY OF THE INVENTION

While conventional scheduling systems and mechanisms for scheduling, executing and dismissing tasks are currently in use, it is always desirable to make improvements to such mechanisms in order to improve overall system performance, reduce cost, reduce bandwidth consumption, and other advantages as one of ordinary skill in the art will appreciate.

In view of the foregoing, various embodiments for selective constant complexity dismissal in task scheduling of a plurality of tasks, each described by one of a plurality of task records, in a computing environment are provided. In one embodiment, by way of example only, a plurality of task records is placed in a task queue. A strictly increasing function is implemented to generate a plurality of unique creation stamps, each of the plurality of unique creation stamps increasing over time pursuant to the strictly increasing function. A new task to be placed with the plurality of tasks is labeled with a new unique creation stamp of the plurality of unique creation stamps. A dismissal action is implemented by at least one of a list of dismissal rules against at least one of the plurality of tasks. The one of the list of dismissal rules holds a minimal valid creation (MVC) stamp, which is updated when the dismissal action implemented by one of the list of dismissal rules is executed. Each task of the plurality of tasks matching the one of the list of dismissal rules having a unique creation stamp lower than the MVC stamp is dismissed.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 5 illustrates pseudo code for an exemplary method for selective complexity dismissal in a task scheduling system.

DETAILED DESCRIPTION OF THE DRAWINGS

Figure 1:
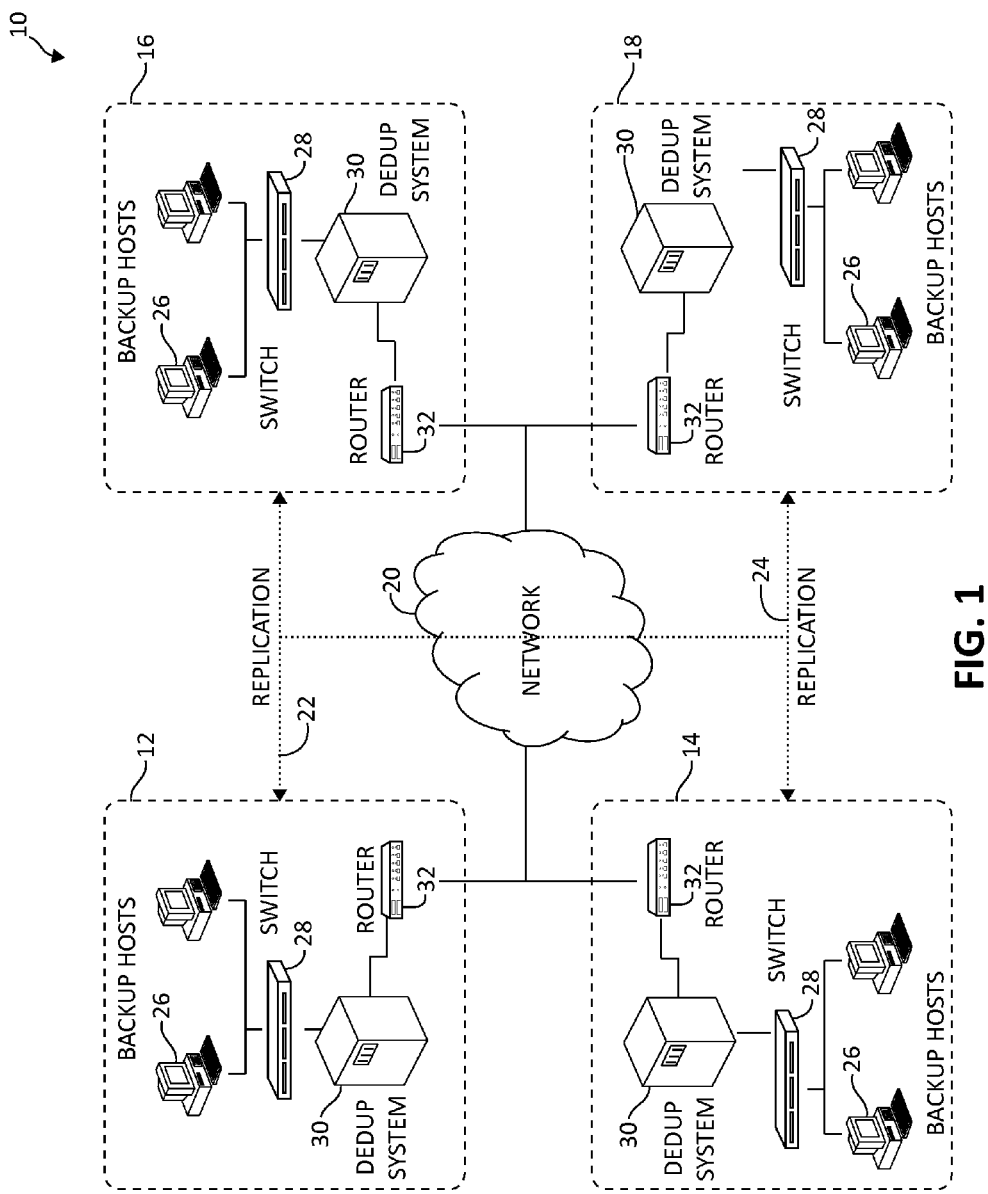
FIG. 1 illustrates an exemplary computing environment in which aspects of the present invention may be implemented.

Turning now to FIG. 1, an exemplary architecture 10 of a computing environment in which various aspects of the present invention and following claimed subject matter is depicted. In the depicted embodiment, architecture 10 is implemented for deduplicated data replication across a network 20 as shown. While architecture 10 is depicted as an exemplary computing environment, one of ordinary skill in the art will appreciate that a variety of computing environments may implement various aspects of the present invention. In fact, any computing environment containing some form of a scheduling system or performing some scheduling functionality may implement at least one or more aspects of the present invention.

Returning to the depicted embodiment, architecture 10 provides storage services to several backup hosts 26. Deduplicated data replication is provided between various deduplication system groups 12, 14, 16, and 18 as indicated by dashed lines 22 and 24. Each of groups 12, 14, 16, and 18 include one or more hosts 26, which are connected to a deduplication system 30 via networking components such as a switch 28 as indicated. Deduplication systems 30 are interconnected via networking components such as a router 32, which provides internetwork connectivity between groups 12, 14, 16, and 18. A network 20 connects such deduplication systems 30 and routers 32. Network 20 may, in one embodiment, include a wide area network (WAN). In other embodiments, network 20 may include local area networks (LANs), storage area networks (SANs), and other network topologies known to the one of ordinary skill in the art. While routers 32 and switches 28 are shown, the one of ordinary skill in the art will also appreciate that additional and/or substitute networking components are contemplated.

In one embodiment, switch 28 is compliant with a fiber channel network protocol, making the switch 28 and interconnected components capable of executing commands such as small computer systems interface (SCSI) commands. Such commands may be executed for a variety of storage devices, again as the one of ordinary skill in the art will appreciate, such as disk drives, tape devices, solid state devices (SSDs), and the like.

As previously mentioned, a scheduling system, operational in such environments as the architecture shown in FIG. 1, is responsible for allocating resources to tasks. A scheduled task may include a variety of attributes. These may include the task source, execution target and attributes related to the manner of its execution. The challenge in such systems is to maximize the overall system performance under given constraints.

A long term scheduling system is a scheduling system in which task execution can be delayed until resources are available. The delayed tasks should be kept in a queue. The task queue may be of various queuing data structures such as First-In-First-Out (FIFO) queue, stack, heap, etc. In some systems, the queuing data structure must be kept persistent. In such systems, a dispatcher is an element responsible of dequeuing tasks from the task queue and allocating the appropriate resources to them. The task selection process by the dispatcher may vary and is defined as the scheduling algorithm.

In the context of task scheduling systems, an event, triggered by a user or by the system itself, may require dismissal of a subset of tasks matching certain criteria. The dismissal process of these tasks may entail a performance penalty on the system as the dismissed tasks need to be removed from the queue. This involves computational penalties of retrieving dismissed tasks and manipulating the queuing data structure. Moreover, in the case of persistent systems, additional penalties of load and save (e.g. input/output (I/O) operations on physical storage devices) are incurred.

A selective constant complexity dismissal mechanism in task scheduling should address the following. First, the mechanism should enable dismissal of a subset of tasks pertaining to a specific attribute or criteria within the task queue. Second the mechanism should allow dismissal in constant time complexity without scanning the tasks for the chosen dismissal criteria. Third, the dismissal operation affects only currently queued tasks. In other words, subsequently queued tasks shall not be affected by this operation. Fourth, the mechanism should enable selective and constant complexity dismissal regardless of the data structure used for scheduling. In other words, the task scheduling queuing mechanism does not affect the tasks' dismissal operation. The mechanism should operate in parallel fashion. In other words, the selective dismissal operation can be parallel to the task scheduling operations and the tasks themselves running simultaneously. Optionally, in some implementations, the mechanisms should provide persistency of the task queue (and associated data structures).

In view of the foregoing, the illustrated embodiments provide a novel approach for selective constant complexity dismissal in task scheduling, satisfying all of the considerations for efficient task dismissal functionality described previously. The illustrated embodiments enable dismissal of a selective tasks subset pertaining to specific criteria, within constant time complexity, and affect only currently queued tasks and not subsequently queued tasks. Moreover, the illustrated embodiments are independent of the data structure used for scheduling. Lastly, as one option for a selected implementation, the illustrated embodiments provide persistency of the task queue (and associated data structures).

Throughout the following description, the below terminology may be used or may relate. A "task record" may be intended to refer to an entity describing execution of tasks, which contains information to be used by a processing procedure. In one embodiment, a task record is stored in a task queue. A "task execution" may be intended to refer to an operation of using data encapsulated in the task record by a processing procedure. A "task dismissal" may refer to an act of preventing a queued task from being taken for execution by a dispatcher. In other words, a dismissed task shall not be executed. The task can be removed, reused, etc., as long as the task is not executed. A "dismissal rule" may be intended to refer to criteria matching specific attributes of a task record, used by and/or represented by the dismissal action.

A "dismissal rules list" may be intended to refer to a set of rules, which each task is compared against when being taken by the dispatcher. In one embodiment, if a task's attributes match one or more rules in this list, the task shall not be taken for execution. A "creation stamp" may be intended to refer to a task attribute based on a monotonic increasing function, as will be further described. A new created task will receive the current system creation stamp. A "dismissal action" may refer to a command, given by a user or other automatic or manual trigger, having a goal to dismiss all tasks that match the same dismissal rule.

The illustrated embodiments enable constant time task dismissal based on a given dismissal rule. In this solution, once a dismissal action has been performed, all of the matching tasks are virtually dismissed and will eventually be removed from the queue. Other, new tasks matching the dismissal rule will not be affected by the dismissal. When a dismissal action is performed, there is a constant-time complexity operation of adding a new dismissal rule to the dismissal rules list. The dismissal action does not interfere nor block task scheduling and/or execution operations.

In one embodiment, for each dismissal rule, the system holds a Minimal Valid Creation (MVC) stamp, as will be further described. The MVC stamp prevents dismissal of tasks that were created after the dismissal action had been performed. In other words, the dismissal action affects only existing tasks and not future tasks.

Figure 2:
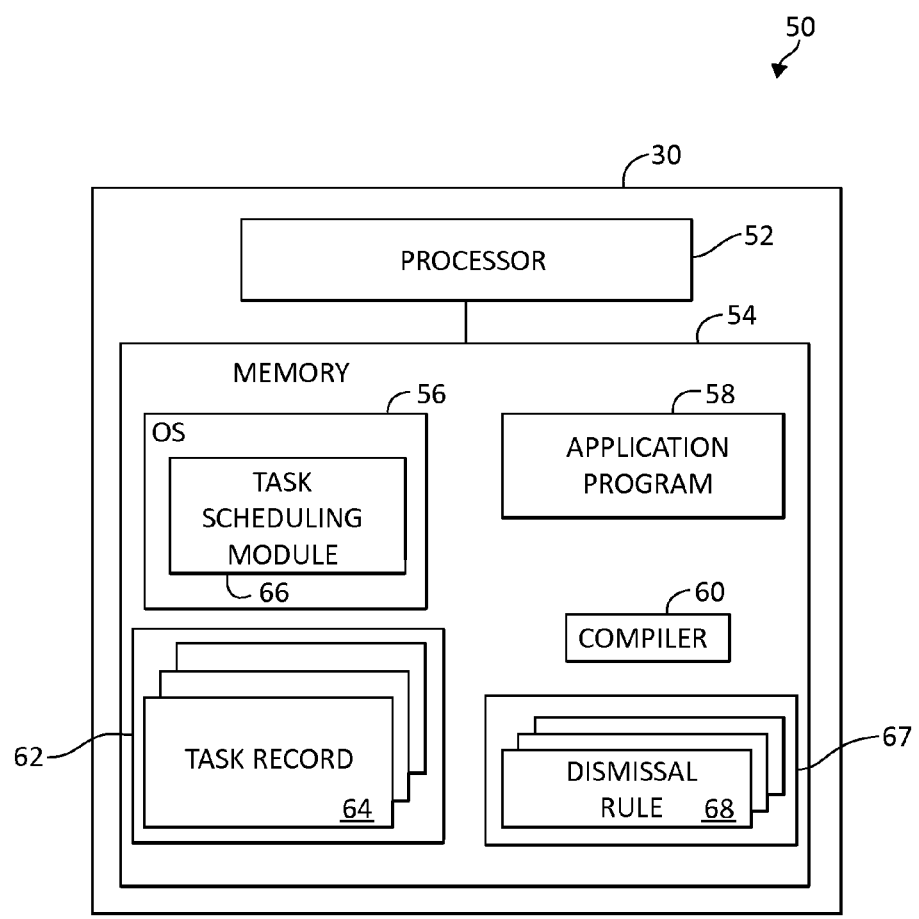
FIG. 2 illustrates an exemplary portion of a scheduling system as illustrated in FIG. 1, previously, including a processor device.

Turning now to FIG. 2, an exemplary portion of a deduplication system 30 as also seen in FIG. 1, previously, is illustrated as a scheduling system 50. Scheduling system 50 is operable in a computer environment as a portion thereof, in which mechanisms of the following illustrated embodiments may be implemented. It should be appreciated, however, that FIG. 2 is only exemplary and is not intended to state or imply any limitation as to the particular architectures in which the exemplary aspects of the various embodiments may be implemented. Many modifications to the architecture depicted in FIG. 2 may be made without departing from the scope and spirit of the following description and claimed subject matter.

Scheduling system 50 includes a processor 52 and a memory 54, such as random access memory (RAM). The scheduling system 50 may be operatively coupled to several components not illustrated for purposes of convenience, including a display, which presents images such as windows to the user on a graphical user interface, a keyboard, mouse, printer, and the like. Of course, those of ordinary skill in the art will recognize that any combination of the above components, or any number of different components, peripherals, and other devices, may be used.

In the illustrated embodiment, the scheduling system 50 operates under control of an operating system (OS) 56 (e.g. z/OS, OS/2, LINUX, UNIX, WINDOWS, MAC OS) stored in the memory 54, and interfaces with the user to accept inputs and commands and to present results. In one embodiment of the present invention, the OS 56 facilitates task scheduling and dismissal functionality according to the present invention. To this end, OS 56 includes a task scheduling module 66 which may be adapted for carrying out various processes and mechanisms in the exemplary methods described following.

The scheduling system 50 may implement a compiler 60 that allows an application program 58 written in a programming language such as COBOL, PL/1, C, C++, JAVA, ADA, BASIC, VISUAL BASIC or any other programming language to be translated into code that is readable by the processor 52. After completion, the computer program 58 accesses and manipulates data stored in the memory 56 of the scheduling system 50 using the relationships and logic that was generated using the compiler 60.

To further implement and execute mechanisms and processes according to the present invention, OS 56, in conjunction with memory 54, processor 52, program 58, and other computer processing, networking, and storage components, may implement task scheduling module 66 as previously described, for, at least in part, scheduling and allocating resources for a plurality of tasks. As the one of ordinary skill in the art will appreciate, the mechanisms of task scheduling module 66, task queue 62 (including a number of task records 64), and dismissal rules list 67 (including a number of individual dismissal rules 68) as presently illustrated may be implemented in various forms and architectures. Accordingly, the illustration of congestion task scheduling module 66, task queue 62, task records 64, dismissal rules list 67 and individual dismissal rules 68 in the present figure is again intended to demonstrate logical relationships between possible computing components in the scheduling system 50, and not to imply a specific physical structure or relationship.

In one embodiment, instructions implementing the operating system 56, the computer program 58, and the compiler 60, as well as the task scheduling module 66, task queue 62, task records 64, dismissal rules list 67, and dismissal rules 68 are tangibly embodied in a computer-readable medium, which may include one or more fixed or removable data storage devices, such as a zip drive, disk, hard drive, DVD/CD-ROM, digital tape, SSDs, etc. Further, the operating system 56 and the computer program 58 comprise instructions which, when read and executed by the system 30, cause the system 30 to perform the steps necessary to implement and/or use the present invention. Computer program 58 and/or operating system 56 instructions may also be tangibly embodied in the memory 56 and/or transmitted through or accessed by network 20 via various components (e.g., router 32, FIG. 1). As such, the terms "article of manufacture," "program storage device" and "computer program product" as may be used herein are intended to encompass a computer program accessible and/or operable from any computer-readable device or media.

Embodiments of the present invention may include one or more associated software application programs 58 that include, for example, functions for managing a distributed computer system comprising a network of computing devices, such as a storage area network (SAN). Accordingly, processor 52 may comprise one or more storage management processors (SMP) or other specialized processor devices known to one of ordinary skill in the art. The program 58 may operate within a single computer and/or deduplication system 30/scheduling system 50 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those of ordinary skill in the art.

Figure 3:
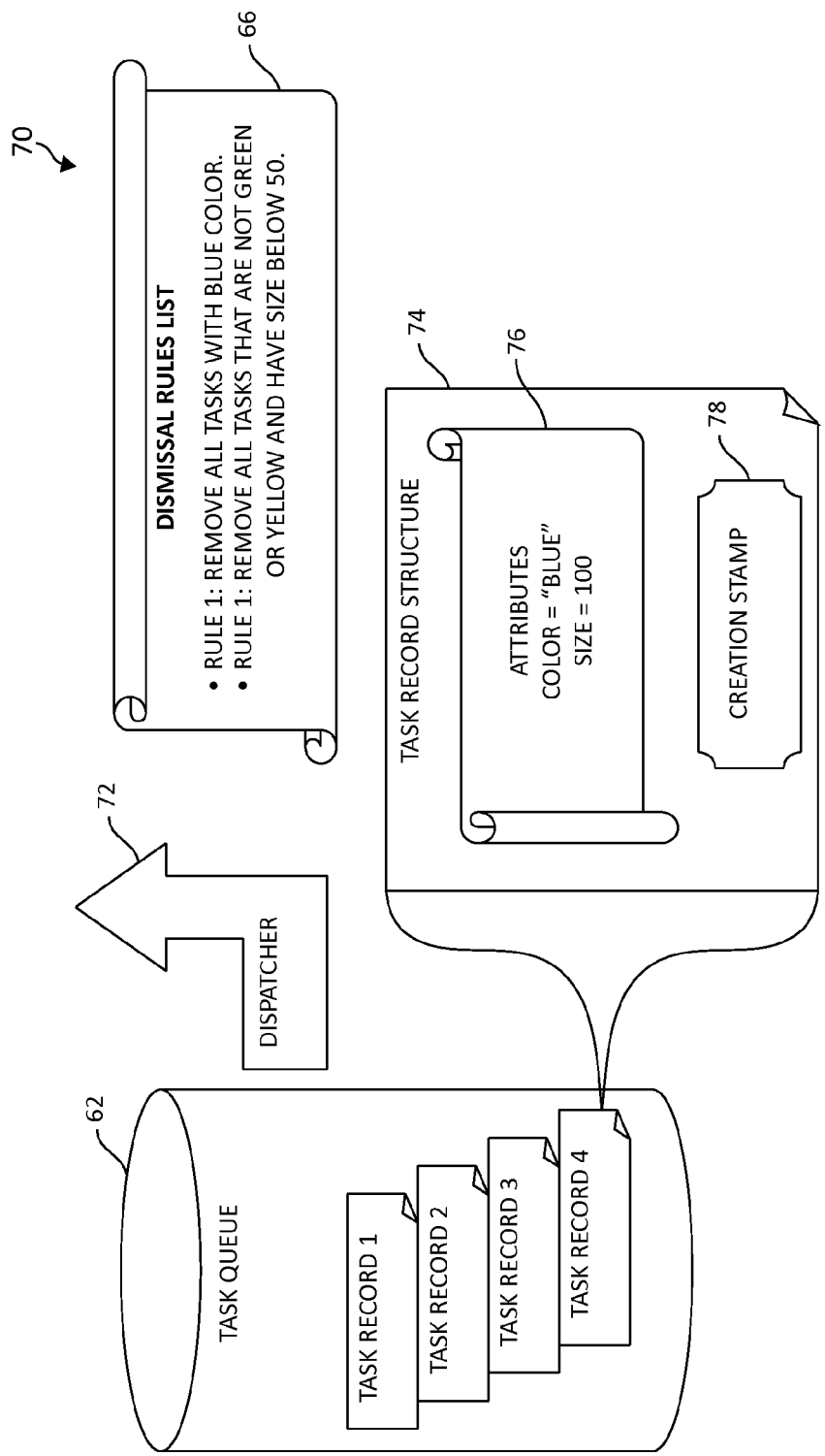
FIG. 3 illustrates an exemplary task record structure, task queue, and dismissal rules list as implemented by the scheduling system of FIG. 2.

Turning next to FIG. 3, various data structures and support components previously introduced in FIG. 2 are further illustrated collectively as scheduling system components 70. Components 70 include the queuing data structure (task queue) 62, which is responsible for maintaining the queued task records 1, 2, 3, 4, . . . n as indicated. A related component is dispatcher 72, which, among other possible functions, dequeues tasks from the queue 62 and initiates their execution. An additional component is the dismissal rules list 66, containing the recorded dismissal actions. In one embodiment, the dispatcher 72 is combined with the dismissal rules list 66, and as such is independent of the specific queue implementation or the task execution logic. Finally, for a particular task record, a task record data structure 74 is illustrated. Each task record structure 74 includes a number of attributes 76 and a creation stamp 78 as depicted.

In one of the illustrated embodiments, the dispatcher 72 uses the internal queuing data structure's dequeue operation to retrieve the next available task for execution. Since the dispatcher is agnostic to the dequeue operation mechanisms, the presently described mechanism remains independent of the queuing mechanisms, whether the queue is persistent or not. When a task is retrieved from the queue by the dispatcher 72, each one of the dismissal rules in the dismissal rules list 66 is checked against the task's attributes 76. If there is a match, the task will be discarded and shall not be executed. This phase is performed prior to the execution phase. The execution itself can be of any type and does not need to be changed in order to support the dismissal mechanisms.

Accordingly, the illustrated embodiments enable to achieve selective constant complexity dismissal in task scheduling, satisfying the guidelines for such an efficient mechanism as discussed previously, and by this improving existing approaches discussed previously. Use of dismissal rules allows for dismissal of a subset of tasks pertaining to specific criteria within the task queue. The dismissal operation requires only addition of a dismissal rule, thus dismissal is done in constant time complexity without scanning the tasks. Because of the use of creation stamps, an associated dismissal operation affects only current time queued tasks and not later created tasks. The illustrated embodiments utilize tasks that are taken by the dispatcher and are independent of the task retrieval data structure; hence selective and constant complexity dismissal is done regardless of the data structure used for scheduling. Any dismissal action is done by adding dismissal rule to the dismissal rules list, so such activity may be performed parallel to the task scheduling operations and the tasks themselves running simultaneously. Finally, the dismissal operation does not change the queuing mechanisms. Trivially the dismissal operation does not interfere with task queue's persistency (and associated data structures).

As previously described, tasks are described by a task record. The task record holds various attributes relevant for the task execution. These task records are held in a task queue. The mechanisms of the present invention use the strictly increasing function to label each new task with a unique creation stamp as will be presently described. A dismissal rule contains criteria, matching specific attributes of a task record. The rule is used by the dismissal action, when we need to dismiss specific tasks, matching the rule's criteria. The dismissal rule holds a Minimal Valid Creation (MVC) stamp. This field is updated when a dismissal action for that rule is executed. All tasks which match this rule, with a creation stamp lower than the rule's MVC, are virtually dismissed.

In other words, all tasks that match the rule and were created before the dismissal action occurred are virtually dismissed. This is due to the fact that the creation stamp generated by function $f$ is strictly increasing over time. If a task was created at time $T_1$ and the dismissal action took place later at time $T_2 > T_1$, then the dismissal rule's MVC stamp $f(T_2)$ is greater than the task's creation stamp $-f(T1)$ and the task is virtually dismissed. If the dismissal action happened at time $T_1$, and a new task was created later at time $T_2 > T_1$, then the dismissal rule's MVC stamp $f(T_1)$ is not greater than the task's creation stamp $-f(T_2)$ and the task is not dismissed.

Figure 4:
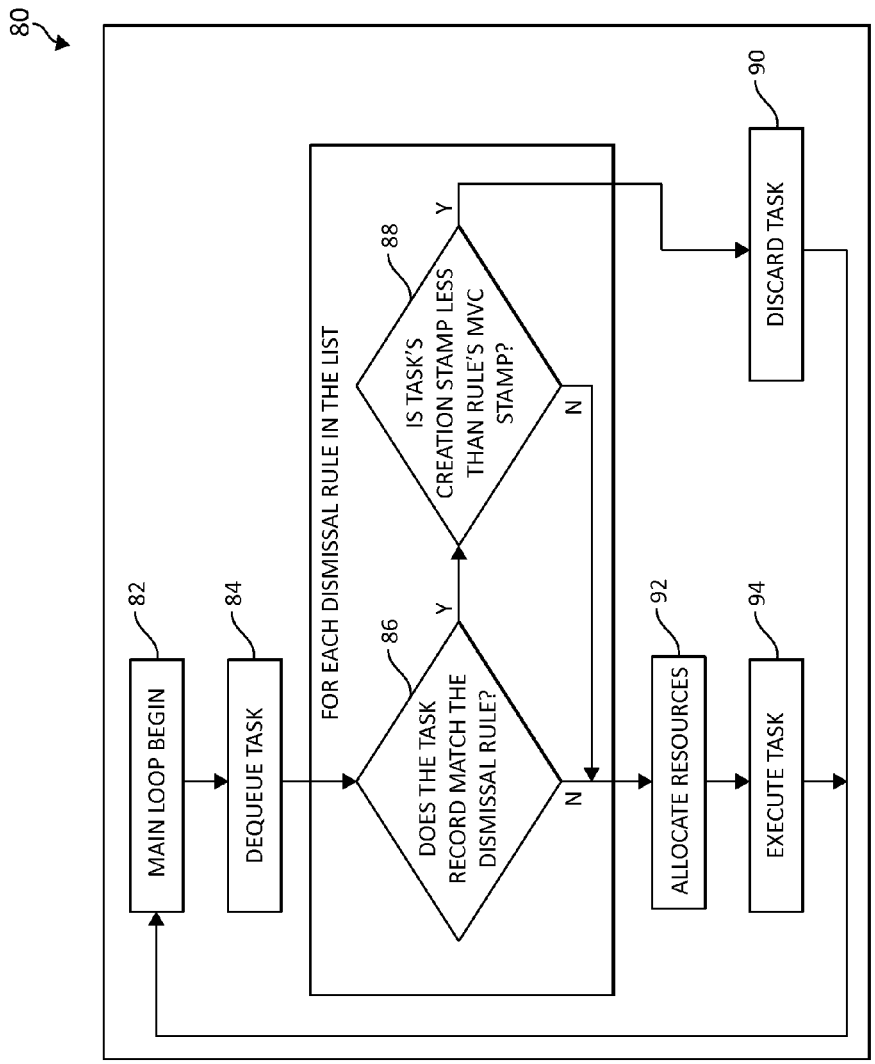
FIG. 4 illustrates an exemplary method for selective constant complexity dismissal in a task scheduling system such as the system illustrated in FIG. 2.

In one embodiment, the dispatcher is the entity responsible for dequeuing tasks from the queue and allocating resources to them. Turning now to FIG. 4, an exemplary method 80 for selective constant complexity dismissal in task scheduling is illustrated. In one embodiment, various aspects of method 80 may be implemented using deduplication system 30 and scheduling system 50 (FIGS. 1 and 2) components, or various other processing, networking, and storage components in computing environments. As one of ordinary skill in the art will appreciate, various steps in the method 80 may be implemented in differing ways to suit a particular application. In addition, the described method may be implemented by various means, such as hardware, software, firmware, or a combination thereof operational on or otherwise associated with the computing environment. For example, the method 80 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums as has been previously described.

As is shown, method 80 provided dispatching functionality as previously described in FIGS. 2 and 3. For example, the dispatching functionality may be responsible for dequeuing a particular task, deciding whether the task was dismissed, and thus discarding the task or allocating resources to the task if the task was not discarded. Method 80 begins (step 82) with a particular task dequeued from the task queue (step 84) as previously described. For each dismissal rule in the applicable dismissal rules list, steps 86 and 88 are performed as presently described. In step 86, the method 80 queries whether the applicable task record matches the particular dismissal rule currently in question. If yes, the method 80 then queries whether the task's creation stamp is less than the rule's MVC stamp (again, step 88). If yes, the task is discarded (step 90).

Returning to step 86, if the task record does not match the dismissal rule, then one or more resources are allocated to the particular task in question (step 92), and the task is executed (step 94). In either of steps 90 and 94, the method 80 returns to step 80 to dequeue an additional task remaining on the task queue.

Turning now to FIG. 5, exemplary pseudo code for performing selective constant complexity task dismissal in task scheduling environments is depicted, as one of ordinary skill in the art will appreciate. The main function starts in line 1. The loop in line 2 is an infinite loop performed by the dispatcher to try and execute the next task. The function in line 3 is used to retrieve the next task candidate for execution from the task queue; this includes dequeueing the task record. The loop in lines 5-12 checks the current task record against all dismissal rules. If a record matches one of the rules (line 7) and the record's creation time is lesser than that rule's MVC (line 8), then the task is considered as dismissed. If indeed the task was considered dismissed, then in lines 13-18 it is either discarded or executed.

To further illustrate the mechanisms of the present invention, several exemplary applications will be briefly described, following, which may implement these mechanisms. First, in the aforementioned context of replication scheduling systems (depicted in an exemplary embodiment in FIGS. 1, 2, previously), the mechanisms of the present invention allows constant time complexity abortion of tasks belonging to a certain logical group (e.g. originating from a certain replication policy) or designated to one of many possible destinations.

Another possible application is dynamic task expiration. The mechanisms of the present invention may be used to dynamically manage lifecycles of tasks. In this application, the dismissal rule defines the maximum lifetime of selective tasks in the queue. The dismissal rule in these cases contains the lifetime stamp, without using any other criteria. The tasks whose lifetime exceeds the lifetime stamp in the dismissal rule shall be dismissed.

Yet another possible application of the illustrated embodiments is redundant task execution prevention. In systems in which there are duplicated tasks queued of similar or identical attributes, it would be beneficial to execute only one of these tasks. This can be achieved by using the proposed method to dismiss the other duplicates. When a new duplicate task is added, a dismissal rule is established (or updated if it already exists) to dismiss older tasks that have similar attributes. Alternatively, this dismissal rule could be used, when a duplicate task begins its first execution, resulting in the dismissal of the other copies of this task already queued in the system.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer-readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the one of ordinary skill in the art will appreciate that modifications and adaptations to those embodiments may be made without departing from the scope of the present invention as set forth in the following claims.

What is claimed is:

1. A method of selective constant complexity dismissal in task scheduling of a plurality of tasks, each described by one of a plurality of task records, in a computing environment by a processor device, comprising:
    placing the plurality of task records in a task queue;
    implementing a strictly increasing function to generate a plurality of unique creation stamps, each of the plurality of unique creation stamps increasing over time pursuant to the strictly increasing function;
    labeling a new task to be placed with the plurality of tasks with a new unique creation stamp of the plurality of unique creation stamps;
    implementing a dismissal action by at least one of a list of dismissal rules against at least one of the plurality of tasks, wherein the one of the list of dismissal rules holds a minimal valid creation (MVC) stamp, the MVC stamp updated when the dismissal action for the one of the list of dismissal rules is executed;
    dequeueing a task from the plurality of tasks for execution;
    identifying a match between one of the list of dismissal rules referring to criteria unrelated to the unique creation stamps and a specific attribute of the task dequeued for execution and determining whether the task dequeued for execution has a unique creation stamp lower than the MVS stamp;
    dismissing the task dequeued for execution to thereby prevent execution thereof, if the specific attribute of the task dequeued for execution matches the one of the list of dismissal rules and has a unique creation stamp lower than the MVC stamp;
    executing the task dequeued for execution, if the specific attribute of the task dequeued for execution does not match the list of dismissal rules or if the task dequeued for execution has a unique creation stamp that is not lower than the MVC stamp; and
    selecting a next task to be dequeued from the plurality of tasks for execution and iterating the steps of identifying and dismissing.

2. The method of claim 1, further including performing the dismissal action by adding the at least one of the list of dismissal rules to the list of dismissal rules.

3. The method of claim 2, wherein performing the dismissal action is performed in parallel with placing the plurality of task records in the task queue.

4. The method of claim 1, further including de-queuing the at least one of the plurality of task records from the task queue for execution by a dispatcher.

5. The method of claim 4, wherein implementing the at least one of the list of dismissal rules further includes comparing at least one attribute of the at least one of the plurality of task records against the at least one of the list of dismissal rules.

6. The method of claim 1, wherein implementing the at least one of the list of dismissal rules is performed in a replication scheduling system for constant time complexity dismissal of tasks belonging to a logical group.

7. The method of claim 1, wherein implementing the at least one of the list of dismissal rules is performed to one of dynamically manage lifecycles of the plurality of tasks and prevent redundant task execution in computing environments having a plurality of queued duplicated tasks.

* * * * *